(12) United States Patent
Manocha

(10) Patent No.: US 11,332,135 B2
(45) Date of Patent: May 17, 2022

(54) DRIVING ASSISTANCE DEVICE, DRIVING ASSISTANCE METHOD, AND COMPUTER PROGRAM

(71) Applicant: Veoneer Sweden AB, Vårgårda (SE)

(72) Inventor: Ashish Manocha, Yokohama (JP)

(73) Assignee: VEONEER SWEDEN AB, Vårgårda (SE)

( * ) Notice: Subject to any disclaimer, the term of this patent is extended or adjusted under 35 U.S.C. 154(b) by 328 days.

(21) Appl. No.: 16/615,262

(22) PCT Filed: May 30, 2018

(86) PCT No.: PCT/JP2018/020693
§ 371 (c)(1),
(2) Date: Nov. 20, 2019

(87) PCT Pub. No.: WO2018/230344
PCT Pub. Date: Dec. 20, 2018

(65) Prior Publication Data
US 2020/0086867 A1    Mar. 19, 2020

(30) Foreign Application Priority Data

Jun. 15, 2017   (JP) .............................. JP2017-117667

(51) Int. Cl.
*B60W 30/12*    (2020.01)
*G08G 1/16*    (2006.01)

(52) U.S. Cl.
CPC ............... *B60W 30/12* (2013.01); *G08G 1/16* (2013.01); *B60W 2420/52* (2013.01); *B60W 2420/54* (2013.01); *B60W 2554/00* (2020.02)

(58) Field of Classification Search
CPC ................................. B60W 30/12; G08G 1/16
(Continued)

(56) References Cited

U.S. PATENT DOCUMENTS

| 7,663,533 B2 | 2/2010 | Toennesen et al. |
| 8,473,144 B1 * | 6/2013 | Dolgov ................. B60W 30/12 701/28 |

(Continued)

FOREIGN PATENT DOCUMENTS

| DE | 102004004492 A1 | 8/2005 |
| DE | 102015210069 A1 | 12/2015 |

(Continued)

OTHER PUBLICATIONS

Non-Final Office Action received for the Japanese Patent Application No. 2019-525295, dated Jun. 22, 2021, 5 pages (1 page of English Translation and 4 pages of Original Copy). Machine Translation provided.

(Continued)

*Primary Examiner* — Peter D Nolan
*Assistant Examiner* — Luke Huynh

(57) ABSTRACT

A driving support apparatus for supporting the driving of a vehicle includes: a boundary estimation part for outputting magnetic waves or ultrasonic waves to the periphery of a vehicle, and for estimating the boundary of a roadway based on reflected waves which are detected by a sensor for detecting the reflected waves; a detection part for detecting a mobile body based on the reflected waves which are detected by the sensor; and a region estimation part for estimating a progress region of the object vehicle which is moving in an adjacent lane when this detection part detects the mobile body generated by multiplexed reflections from an object vehicle which is actually moving in the adjacent lane.

7 Claims, 9 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 2007/0222662 | A1* | 9/2007 | Toennesen | H01Q 25/002 342/27 |
| 2015/0353078 | A1 | 12/2015 | Kaminade | |
| 2018/0293894 | A1* | 10/2018 | Zhang | G01S 17/86 |
| 2019/0118809 | A1* | 4/2019 | Niino | B60W 60/001 |

FOREIGN PATENT DOCUMENTS

| | | |
|---|---|---|
| JP | H09132094 A | 5/1997 |
| JP | 2000147115 A | 5/2000 |
| JP | 2001116839 A | 4/2001 |
| JP | 2003270342 A | 9/2003 |
| JP | 2007531872 A | 11/2007 |
| JP | 2009186277 A | 8/2009 |
| JP | 2013250151 A | 12/2013 |
| JP | 2014191632 A | 10/2014 |
| JP | 2015230566 A | 12/2015 |
| JP | 2016148547 A | 8/2016 |

OTHER PUBLICATIONS

Notice of Reasons For Refusal received for the Japanese Patent Application No. 2019-525295, dated Dec. 15, 2020, 7 pages (4 pages of English Translation and 3 pages of Original Copy).
International Search Report (in English and Japanese) and Written Opinion (in Japanese) issued in PCT/JP2018/020693, dated May 30, 2018; ISA/JP.

* cited by examiner

DRIVING ASSISTANCE DEVICE, DRIVING ASSISTANCE METHOD, AND COMPUTER PROGRAM

CROSS-REFERENCE TO RELATED APPLICATIONS

This application is a 371 U.S. National Phase of International Application No. PCT/JP2018/020693, filed on May 30, 2018, which claims the benefit of Japanese Patent Application No. 2017-117667, filed on Jun. 15, 2017. The entire disclosures of the above applications are incorporated herein by reference.

FIELD OF THE INVENTION

The present disclosure relates to a driving support apparatus for supporting the driving of a vehicle, etc.

BACKGROUND ART

In terms of safety such as when changing lanes, a vehicle may include a driving support apparatus for supporting the driving of a vehicle by a driver (for example, see Patent Document 1).

The driving support apparatus outputs magnetic waves or ultrasonic waves to the periphery of a vehicle, in addition to detecting a sensor for detecting a detection object such as another vehicle or a guard rail, based on reflected waves which are detected by a sensor for detecting the reflected waves. The sensor is, for example, a millimeter wave sensor or an ultrasonic wave sensor, etc., and is installed to the front right and left ends of a vehicle, etc. For example, the detection region of the sensor installed at the right end spreads like a fan so as to lead from the right front to the right rear of the vehicle via the right side thereof centering around the sensor.

If the sensor installed at the right end detects the same detection object in the detection region multiple times, the driving support apparatus detects this detection object as another vehicle approaching from the right rear and estimates the trajectory of the other vehicle as an object to be detected (hereinafter, referred to as an "object vehicle"). If the driving support apparatus detects the object vehicle and estimates the trajectory thereof, for example, a sound, flashing light, etc. urges the driver to refrain from changing lanes.

PRIOR ART DOCUMENTS

Patent Documents

Patent Document 1: JP 2007-531872 W

SUMMARY OF THE INVENTION

Problems to be Solved by the Invention

Unfortunately, the speed of an object vehicle may delay detection and render the estimation of the trajectory of the object vehicle inaccurate.

The present disclosure has been created in view of the abovementioned problems, with an object of providing a driving support apparatus, driving support method, and computer program, which can favorably support driving.

Means for Solving the Problems

A driving support apparatus according to one embodiment of the present disclosure is a driving support apparatus for supporting the driving of a vehicle, including: a boundary estimation part for outputting magnetic waves or ultrasonic waves to the periphery of a vehicle, and for estimating the boundary of a roadway based on reflected waves which are detected by a sensor for detecting the reflected waves; a detection part for detecting a mobile body based on the reflected waves which are detected by the sensor; and a region estimation part for estimating a progress region of the object vehicle which is moving in an adjacent lane when this detection part detects the mobile body generated by multiplexed reflections from an object vehicle which is actually moving in the adjacent lane.

According to one embodiment of the present disclosure, if the detection part detects a mobile body on the opposite side of the vehicle on the boundary behind the boundary of the roadway, the detection part detects a false image due to the reflection of magnetic waves or ultrasonic waves of the object vehicle which is moving in an adjacent lane. Because this false image is detected based on the reflected waves, the vehicle disposed outside the detection region of the sensor is detected. Therefore, an object vehicle disposed outside the detection region of the sensor can be detected as a false image, while the actual progress region of the object vehicle can be estimated. As a result, before the object vehicle enters the detection region, this object vehicle can be detected to estimate the progress region. Moreover, it is possible to support, for example, urging of the driver to refrain from changing lanes in accordance with the estimated progress region, thereby favorably supporting driving.

In the driving support apparatus according to one embodiment of the present disclosure, the detection part outputs a stop signal for refraining from changing lanes upon detecting the mobile body disposed in the progress region.

According to one embodiment of the present disclosure, when the object vehicle enters the estimated progress region, refraining from changing lanes can be urged or restraint executed. Therefore, before the object vehicle enters the detection region of the sensor and is detected, it is possible to detect the object vehicle, urge to refrain from changing lanes, or execute restraint, making it possible to favorably support driving.

In the driving support apparatus according to one embodiment of the present disclosure, the region estimation part estimates the progress region of the object vehicle in the adjacent lane, based on the distance between the boundary and the mobile body which the detection part has detected behind the boundary of the roadway.

According to one embodiment of the present disclosure, the progress region can be favorably estimated to support driving.

In the driving support apparatus according to one embodiment of the present disclosure, the region estimation part estimates the actual position of the object vehicle, based on the mobile body due to the multiplexed reflections from behind the boundary of the roadway.

According to one embodiment of the present disclosure, the progress region can be favorably estimated to support driving.

A driving support method according to one embodiment of the present disclosure is a driving support method for supporting the driving of a vehicle, including the steps of: outputting magnetic waves or ultrasonic waves to a periphery of a vehicle, and estimating a boundary of a roadway based on reflected waves which are detected by a sensor for detecting the reflected waves; detecting a mobile body based on multiplexed reflected waves which are detected by the sensor; and estimating a progress region of the object vehicle (when the object vehicle is disposed on the vehicle side of the boundary), based on a position of the detected object vehicle, upon detecting an object vehicle which is moving in an adjacent lane behind the boundary of the roadway.

According to one embodiment of the present disclosure, an object vehicle disposed outside the detection region of the sensor can be detected as a false image, while the actual progress region of the object vehicle can be estimated. As a result, before the object vehicle enters the detection region, this object vehicle can be detected to estimate the progress region. Moreover, it is possible to support, for example, urging the driver to refrain from changing lanes in accordance with the estimated progress region, thereby favorably supporting driving.

A computer program according to one embodiment of the present disclosure is a computer program for making a computer execute the processes of: outputting magnetic waves or ultrasonic waves to a periphery of a vehicle, and estimating a boundary of a roadway based on reflected waves which are detected by a sensor for detecting the reflected waves; detecting a mobile body based on multiplexed reflected waves which are detected by the sensor; and estimating a progress region of the object vehicle (when the object vehicle is disposed on the vehicle side of the boundary) based on a position of the detected object vehicle upon detecting an object vehicle which is moving in an adjacent lane behind the boundary of the roadway.

According to one embodiment of the present disclosure, an object vehicle disposed outside the detection region of the sensor can be detected as a false image, while the actual progress region of the object vehicle can be estimated. As a result, before the object vehicle enters the detection region, this object vehicle can be detected to estimate the progress region. Moreover, it is possible to support, for example, urging the driver to refrain from changing lanes in accordance with the estimated progress region, thereby favorably supporting driving.

Effects of the Invention

According to one embodiment of the present disclosure, driving can be favorably supported.

MODE FOR CARRYING OUT THE INVENTION

Hereinafter, a driving support apparatus according to the present disclosure will be described in detail based on the drawings indicating the embodiments.

Figure 1:
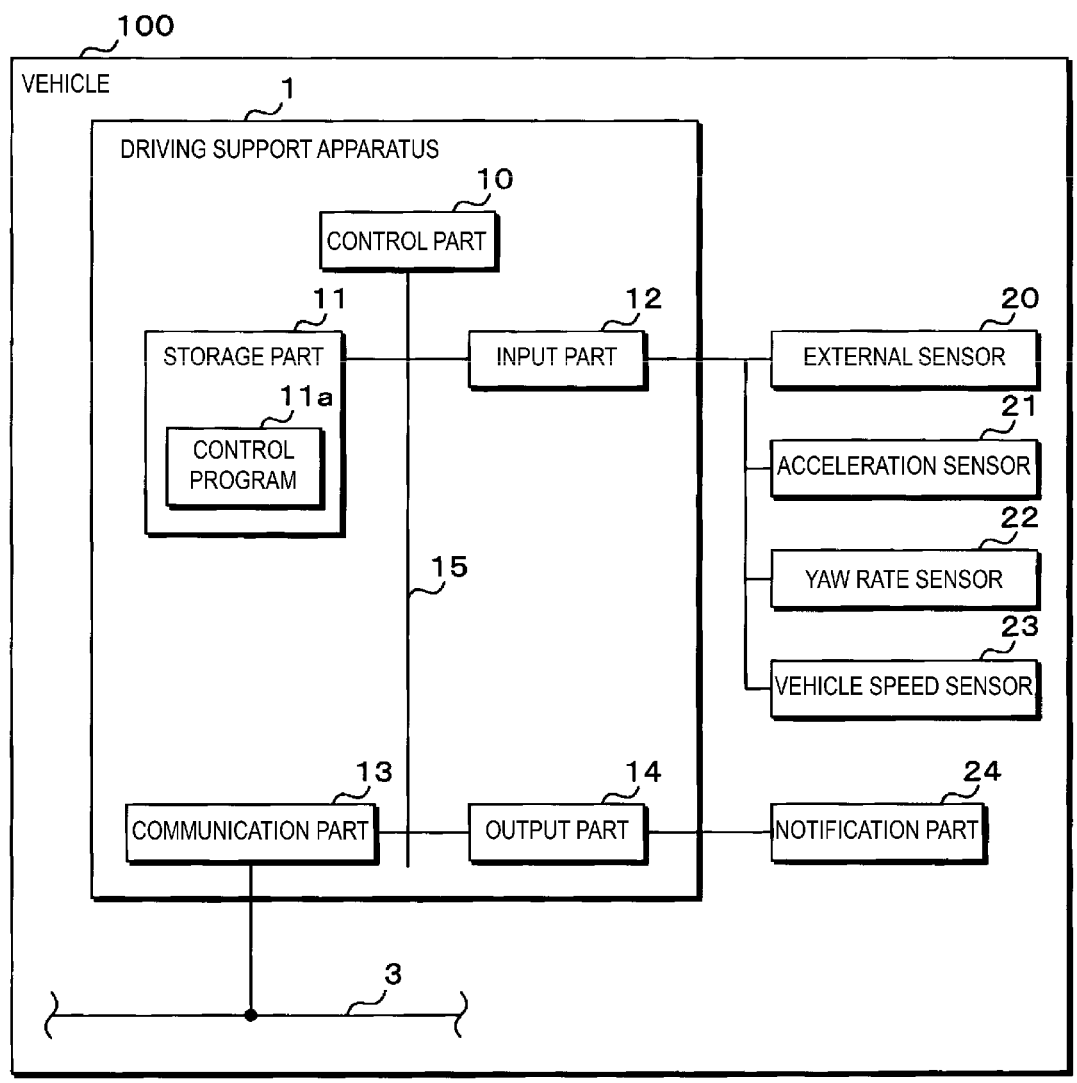
FIG. 1 is a block diagram illustrating the configuration of a vehicle equipped with a driving support apparatus according to an embodiment.

FIG. 1 is a block diagram illustrating the configuration of a vehicle equipped with a driving support apparatus according to an embodiment. In FIG. 1, 100 illustrated is an own vehicle, wherein the own vehicle 100 includes a driving support apparatus 1, an external sensor 20, an acceleration sensor 21, a yaw rate sensor 22, a vehicle speed sensor 23, a notification part 24, and a communication bus 3. Hereinafter, the left and right of the own vehicle 100 respectively refer to the left hand direction and the right hand direction with respect to the common progress direction of the vehicle. The own vehicle 100 runs via manual driving by a passenger or via automatic driving under the control of an ECU (Electronic Control Unit).

The driving support apparatus 1 is connected to the external sensor 20, the acceleration sensor 21, the yaw rate sensor 22, the vehicle speed sensor 23, the notification part 24, and the communication bus 3. The external sensor 20 is a millimeter wave radar, ultrasonic wave sensor, etc., and outputs magnetic waves or ultrasonic waves to the periphery of the vehicle, in addition to detecting the reflected waves of the output magnetic waves or ultrasonic waves.

Figure 2:
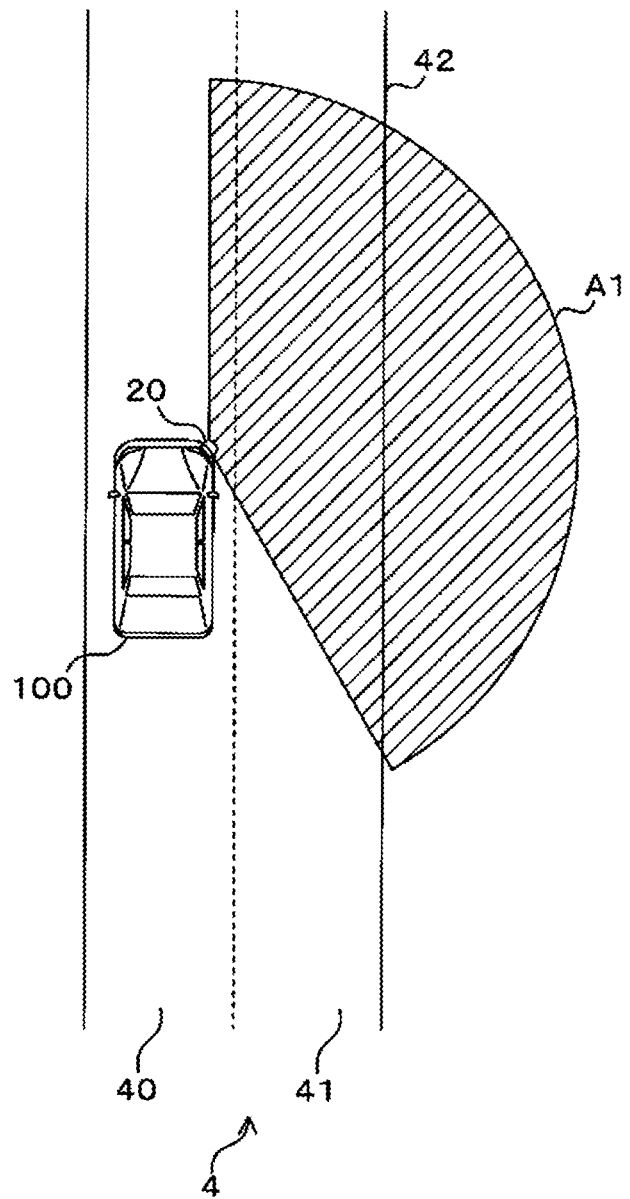
FIG. 2 is a schematic diagram illustrating a detection region of an external sensor.

FIG. 2 is a schematic diagram illustrating the detection region A1 of the external sensor 20. The external sensor 20 is, for example, provided at each end in the left and right direction on the front of the own vehicle 100, etc. FIG. 2 illustrates the external sensor 20 at the front right end, while the radar at the left end and the radar at other positions also have a detection region, with the same process as the below-mentioned driving support process carried out. In FIG. 2, the own vehicle 100 runs in the left lane 40 of a roadway 4 which has a left lane 40 and a right lane 41 (which are the same lanes in the progress direction). A guard rail, a wall of a building, etc., a soundproof wall, etc. are provided along the right lane 41 on a boundary 42 on the right of the roadway 4.

As illustrated in FIG. 2, the detection region A1 of the external sensor 20 spreads like a fan from the right front to the right side and right rear of the own vehicle 100 centering around the external sensor 20. Moreover, the detection region A1 leads to the right of the boundary 42 in the left and right direction, wherein the below-mentioned magnetic waves or ultrasonic waves output by the external sensor 20 are reflected on the guard rail of the boundary 42.

The external sensor 20 outputs magnetic waves or ultrasonic waves in the detection region A1, in addition to detecting the reflected waves of the output magnetic waves or ultrasonic waves. Based on the value according to the reciprocating time from the external sensor 20 of magnetic waves or ultrasonic waves to the reflection point, a control part 10 measures and detects the position of a detection object such as the vehicle or guard rail in the detection region A1.

The acceleration sensor 21 detects the acceleration of the own vehicle 100, while the vehicle speed sensor 23 detects the vehicle speed. The yaw rate sensor 22 detects the rate (at which the angle (yaw angle) formed between a predetermined direction (for example, the north direction) and the running direction of the own vehicle 100 changes), the so-called yaw rate. The values detected by the external sensor 20, the acceleration sensor 21, the yaw rate sensor 22, and the vehicle speed sensor 23 are input into the driving support apparatus 1.

The notification part 24 is a speaker or LED light, etc. provided in the vehicle interior of the own vehicle 100 and is operated by a signal output by the driving support apparatus 1. The communication bus 3 is connected to each ECU equipped with the own vehicle 100 such as a body ECU or engine ECU. The driving support apparatus 1 can mutually communicate with each ECU such as the body ECU or engine ECU via the communication bus 3. The driving support apparatus 1 and each ECU communicate with each other based on communications standards such as, for example, a CAN (Controller Area Network) and LIN (Local Interconnect Network).

The driving support apparatus 1 has the control part 10, a storage part 11, an input part 12, a communication part 13, an output part 14, and a communication bus 15. The control part 10 is a CPU (Central Processing Unit) or MPU (Micro-Processing Unit), etc. The storage part 11 includes a ROM (Read Only Memory), RAM (Random Access Memory), etc., and stores a control program 11a for supporting driving. The input part 12 is connected to the external sensor 20, the acceleration sensor 21, the yaw rate sensor 22, and the vehicle speed sensor 23, wherein the values detected by the external sensor 20, the acceleration sensor 21, the yaw rate sensor 22, and the vehicle speed sensor 23 are input into the input part 12.

The communication part 13 is connected to the communication bus 3. The output part 14 is connected to the notification part 24 to output, to the notification part 24, a signal from the control part 10. The communication bus 15 is connected to the control part 10, the storage part 11, the input part 12, the communication part 13, and the output part 14, such that the control part 10 can communicate with the storage part 11, the input part 12, the communication part 13, and the output part 14 via the communication bus 15.

In the driving support apparatus 1, based on the values input from the external sensor 20, the acceleration sensor 21, the yaw rate sensor 22, and the vehicle speed sensor 23 to the input part 12, as mentioned below, the control part 10 outputs signals to the notification part 24 and the communication bus 3 via the communication part 13 and the output part 14, so as to support driving of the own vehicle 100.

While the own vehicle 100 is running, the control part 10 reads the control program 11a, and periodically carries out the driving support process described below. The driving support process will be described with reference to FIGS. 3 to 9.

Figure 3:
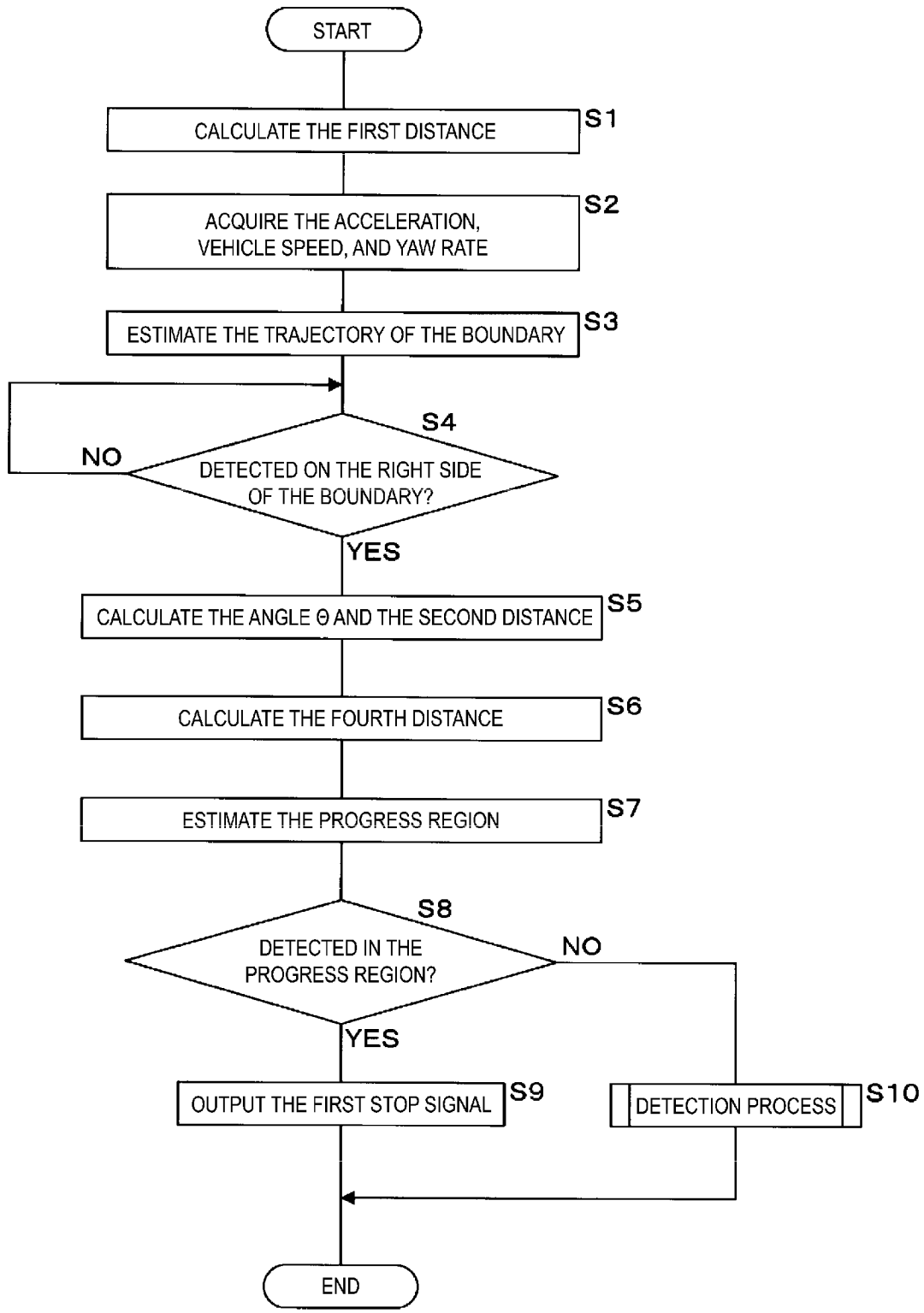
FIG. 3 is a flowchart illustrating a procedure of a driving support process carried out by a control part.
Figure 4:
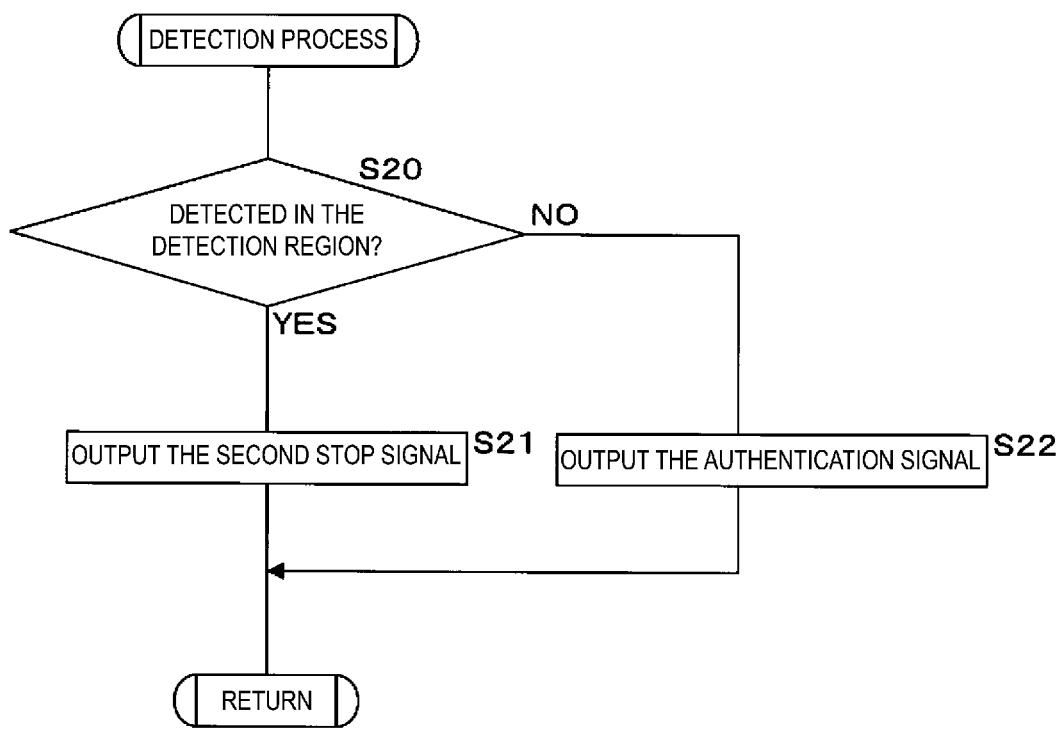
FIG. 4 is a flowchart illustrating the procedure of the detection process.
Figure 5:
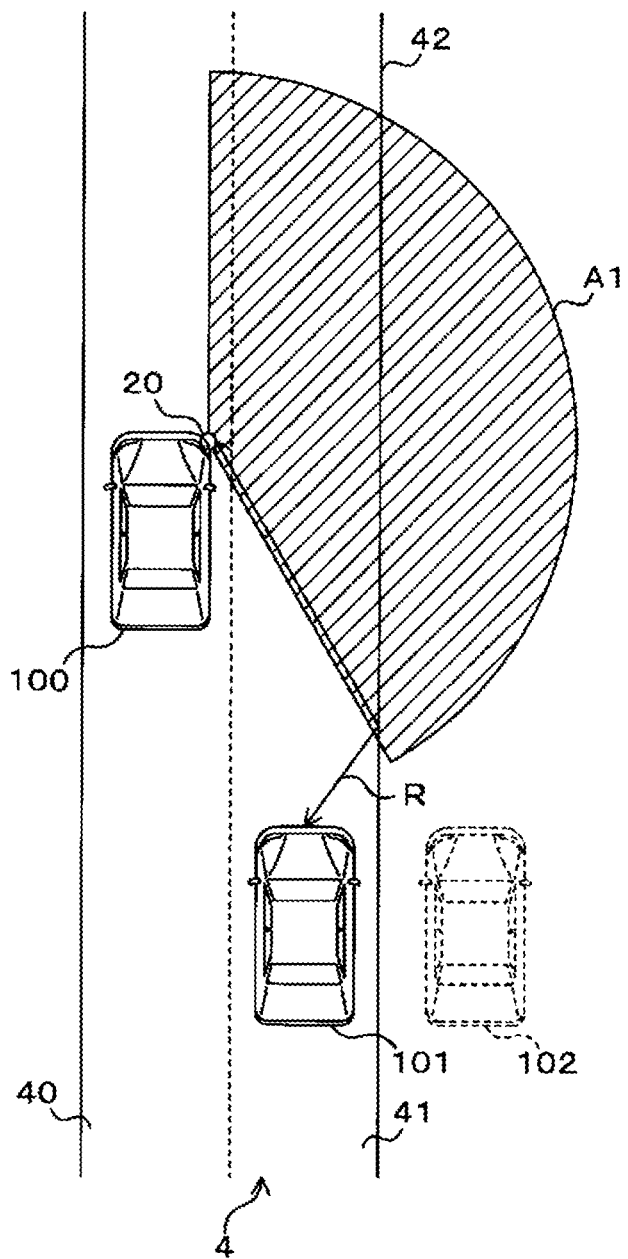
FIG. 5 is a schematic diagram illustrating a false image based on reflection.
Figure 6:
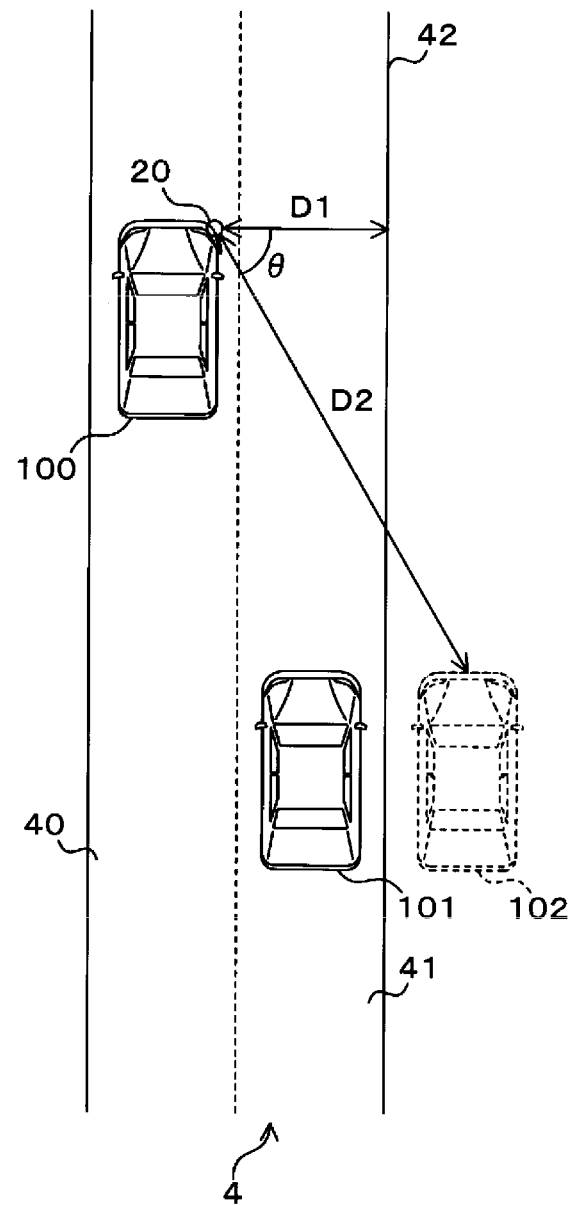
FIG. 6 is a schematic diagram illustrating the position of the false image.
Figure 7:
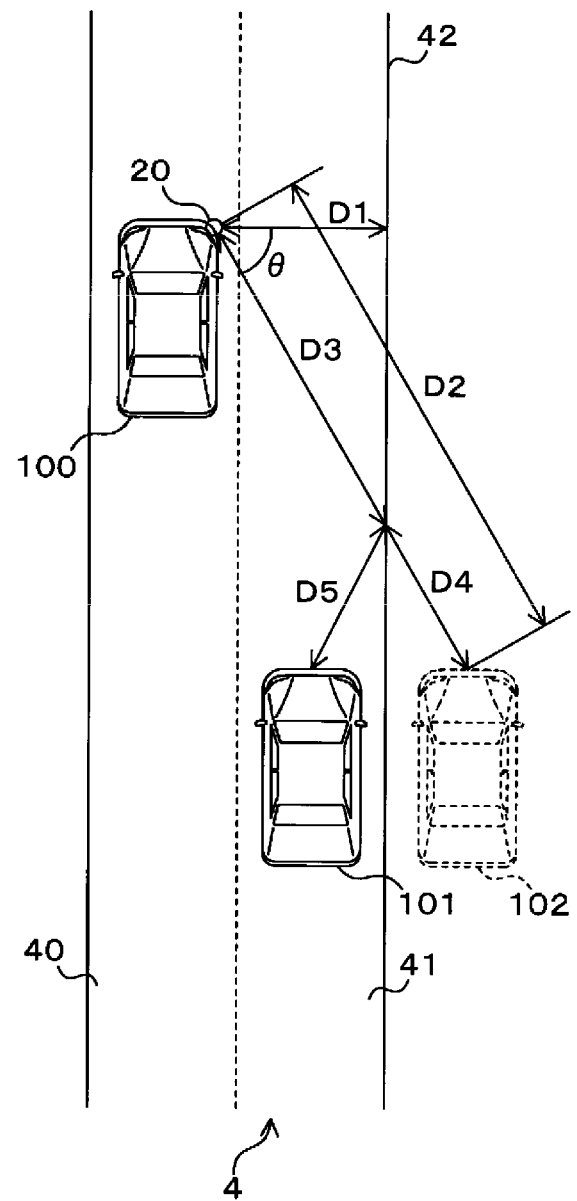
FIG. 7 is a schematic diagram illustrating the position of the false image.
Figure 8:
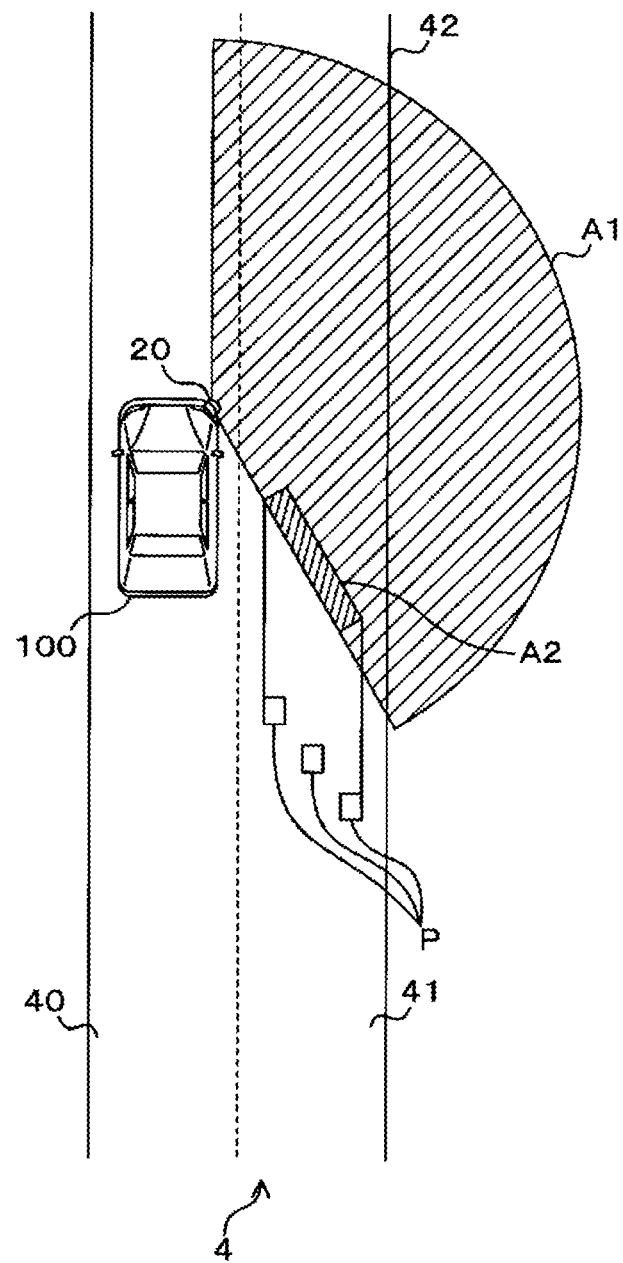
FIG. 8 is a schematic diagram illustrating an estimated progress region.
Figure 9:
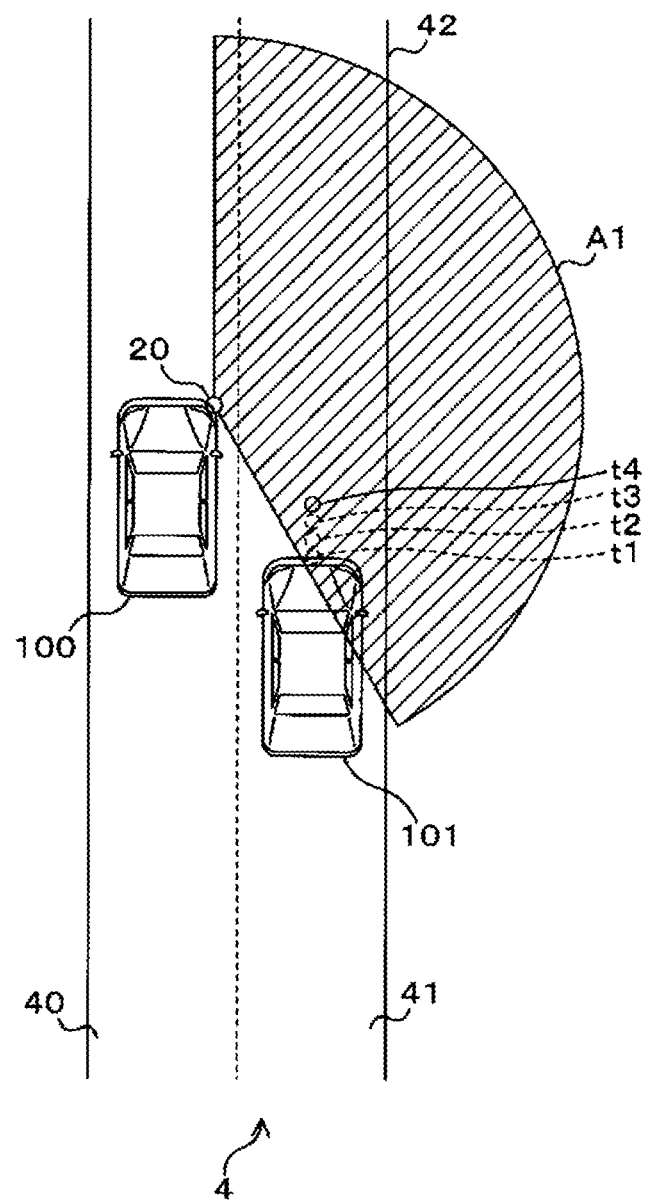
FIG. 9 is a schematic diagram illustrating the detection aspect of an object vehicle.

FIG. 3 is a flowchart illustrating the procedure of the driving support process carried out by the control part 10. FIG. 4 is a flowchart illustrating the procedure of the detection process. FIG. 5 is a schematic diagram illustrating a false image based on reflection. FIGS. 6 and 7 are schematic diagrams illustrating the position of the false image. FIG. 8 is a schematic diagram illustrating an estimated progress region. FIG. 9 is a schematic diagram illustrating the detection aspect of an object vehicle.

The control part 10 first acquires a value detected by the external sensor 20 and calculates a first distance D1 (see FIG. 6) between the external sensor 20 and the boundary 42 based on this value (S1). The first distance D1 refers to the distance serving as the shortest distance such that the straight line extending towards the boundary 42 of a guard rail, wall of a building, soundproof wall, etc. provided along the roadway from the external sensor 20 is orthogonal to this boundary 42. Subsequently, the control part 10 acquires the acceleration and vehicle speed of the own vehicle 100 from the acceleration sensor 21 and the vehicle speed sensor 23, in addition to acquiring the yaw rate of the own vehicle 100 from the yaw rate sensor 22 (S2).

The control part 10 estimates the trajectory of the boundary 42 of the roadway 4 based on the acquired acceleration, vehicle speed, yaw rate, and first distance D1 (S3). At this time, the trajectory of the estimated boundary is parallel in the anteroposterior direction so as to overlap the guard rail of the boundary 42.

Here, as illustrated in FIG. 5, also outside the detection region A1 of the external sensor 20, magnetic waves or ultrasonic waves are, for example, reflected on the guard rail on the boundary 42 of the roadway 4 along a reflection path R and lead to the detection object outside the detection region A1. If an object vehicle 101, which is another vehicle as an object to be detected running in the right lane 41, approaches from behind, magnetic waves or ultrasonic waves reflected on the guard rail are further subjected to multiplexed reflections in the object vehicle 101 and return to the external sensor 20 along the reflection path R. Note that illustrated paths, as well as multiple paths having other angles and distances, are assumed as the reflection path R.

If the external sensor 20 detects reflected waves due to the so-called multiplexed reflections along the reflection path R as mentioned above, the control part 10 detects a false image 102 (as a mobile body disposed on the right of the boundary 42) as the object vehicle 101.

The control part 10 estimates the trajectory of the boundary 42 of the roadway 4, then determines whether or not the detection object has been detected on the right of the boundary 42, based on the value of the external sensor 20 (S4). If the control part 10 determines that the detection object has not been detected (S4: NO), the control part 10 returns the process to Step S4. If the control part 10 determines that the detection object has been detected (S4: YES), a second distance D2 between the false image 102 and the external sensor 20, along with the angle θ formed between the first distance D1 and the second distance D2, is calculated (S5). Here, the first distance D1 and the second distance D2 are linear distances. Moreover, the detection object is the false image 102.

Subsequently, the control part 10 calculates a third distance D3 (D3=D1/cos θ=D1×sec θ, see FIG. 7) between the external sensor 20 and the boundary 42 in the second distance D2, subtracts the third distance D3 from the second distance D2, and calculates a fourth distance D4 (D4=D2−D3=the distance between the false image 102 and the external sensor 20−D1×sec θ, see FIG. 7) between the false image 102 and the boundary 42 (S6).

Subsequently, the control part 10 estimates a fifth distance D5 (see FIG. 7) between the actual object vehicle 101 and the boundary 42 based on the fourth distance D4, estimates the assumed position P of the actual object vehicle 101, and estimates a progress region A2 of the object vehicle 101 based on this position P (S7). Because multiple reflection paths R of magnetic waves or ultrasonic waves are assumed, the control part 10 assumes multiple fifth distances D5 and positions P. The progress region A2 is estimated based on multiple positions P and estimated at a position overlapping the right rear in the detection region A1 at a width including the rightmost position P and the leftmost position P (see FIG. 8). Note that in FIG. 8, an illustration of the object vehicle 101 is omitted.

The control part 10 estimates the progress region A2, then determines whether or not the detection object has been detected in the progress region A2 (S8). If the control part 10 determines that a detection object has been detected (S8: YES), the control part 10 outputs a first stop signal (S9) and completes the process. If the control part 10 determines that a mobile detection object has not been detected (S8: NO), the control part 10 carries out a detection process (S10). Here, the detection object is the object vehicle 101.

If the first stop signal is, for example, output from the control part 10 to the notification part 24 and the first stop signal is input, the notification part 24 urges the driver of the own vehicle 100 to refrain from changing lanes due to the output of a sound or flashing of an LED, etc. Moreover, the first stop signal may be output from the control part 10 to another ECU via the communication bus 3, after which the own vehicle 100 may automatically refrain from changing lanes regardless of the operation of the driver.

The control part 10 determines whether or not a mobile body such as a vehicle has been detected in the detection region A1 in the detection process (S20). Here, upon detecting the mobile body, the control part 10 detects the detection object as a mobile body if reflected waves from the detection object in the detection region A1 are detected four times at times t1, t2, t3, and t4 (t1<t2<t3<t4) (see FIG. 9).

If the control part 10 determines that a mobile body has been detected (S20: YES), the control part 10 outputs a second stop signal (S21) and completes the process. If the control part 10 determines that a mobile body has not been detected (S20: NO), the control part 10 outputs an authentication signal (S22) and completes the process.

The second stop signal is output from the control part 10 to the notification part 24, after which the driver of the own vehicle 100 is urged to refrain from changing lanes. Moreover, the first stop signal may be output to an ECU connected to the communication bus 3, while the own vehicle 100 may be controlled so as to automatically refrain from changing lanes, regardless of the operation of the driver. The authentication signal is output from the control part 10 to the notification part 24, after which the driver of the own vehicle 100 is urged regarding the possibility of changing lanes. Moreover, the authentication signal may be output to the ECU connected to the communication bus 3, after which, regardless of the operation of the driver, the own vehicle 100 may be controlled so as to automatically change lanes.

According to the above configuration, if the control part 10 makes a detection on the right of the boundary 42, the control part 10 detects a false image 102 due to the reflection of magnetic waves or ultrasonic waves of the object vehicle 101. Because this false image 102 is detected based on the reflected waves, even when the object vehicle 101 is disposed outside the detection region A1 of the external sensor 20, it can be detected. Therefore, an object vehicle 101 disposed outside the detection region A1 of the external sensor 20 can be detected as a false image 102, while the actual progress region A2 of the object vehicle 101 can be estimated. As a result, before the object vehicle 101 enters the detection region A1, this object vehicle 101 can be detected to estimate the progress region A2. Moreover, it is possible to support, for example, urging the driver to restrain from changing lanes in accordance with the estimated progress region A2, thereby favorably supporting driving.

When the object vehicle 101 enters the estimated progress region A2, refraining from changing lanes can be urged or restraint can be executed. Therefore, before the object vehicle 101 enters the detection region A1 of the external sensor 20 to make a detection, it is possible to detect the object vehicle 101, urge to refrain from changing lanes, or execute restraint, making it possible to favorably support driving.

The control part 10 characteristically estimates the progress region A2 based on the third distance D3 between the false image 102 and the boundary 42, making it possible to favorably estimate the progress region A2 and support driving. The control part 10 estimates the multiple actual positions P of the object vehicle 101 in terms of the false image 102 based on the third distance D3, estimates the progress region A2 of the object vehicle 101 based on the estimated actual positions P, and therefore can estimate the progress region A2 and support driving.

Embodiments not disclosed herein should be regarded as illustrative in all respects and not restrictive. The scope of the present disclosure is indicated not by the abovementioned meaning but by the claims and is intended to include all changes in the meaning and scope equivalent to the claims. That is, embodiments obtained by combining the technical means which is appropriately changed within the scope indicated in the claims are included in the technical scope of the present disclosure.

EXPLANATION OF THE SYMBOLS

1 Driving support apparatus
10 Control part (boundary estimation part, detection part, and region estimation part)
11a Control program
20 External sensor (sensor)
42 Boundary
100 Own vehicle (vehicle)
101 Object vehicle
102 False image
A1 Detection region
A2 Progress region
D3 Third distance (distance)
P Actual position

The invention claimed is:

1. A driving support apparatus for supporting the driving of a vehicle, the driving support apparatus comprising:
a boundary estimation part for outputting magnetic waves or ultrasonic waves to a periphery of the vehicle, and for estimating a boundary of a roadway based on reflected waves which are detected by a sensor for detecting reflected waves;
a detection part for detecting a mobile body based on reflected waves which are detected by the sensor; and
a region estimation part for estimating a progress region of an object vehicle which is moving in an adjacent lane when this detection part detects the mobile body generated by multiplexed reflections from the object vehicle which is actually moving in the adjacent lane,
wherein the object vehicle is outside of a detection area of the sensor and the magnetic or ultrasonic waves are reflected to the object vehicle by the boundary, and
wherein the detection part is further for, when the object vehicle is determined to be in the progress region, at least one of (a) turning on a light indicating to refrain from changing lanes and (b) via a speaker outputting a sound indicating to refrain from changing lanes.

2. The driving support apparatus according to claim 1, wherein the detection part outputs a stop signal for refraining from changing lanes upon detecting the mobile body disposed in the progress region.

3. The driving support apparatus according to claim 1, wherein the region estimation part estimates the progress region of the object vehicle in the adjacent lane, based on a distance between the boundary and the mobile body which the detection part has detected behind the boundary of the roadway.

4. The driving support apparatus according to claim 3, wherein the region estimation part estimates an actual position of the object vehicle, based on the mobile body due to the multiplexed reflections from behind the boundary of the roadway.

5. A driving support method for supporting the driving of a vehicle, the method comprising—:
   outputting magnetic waves or ultrasonic waves to a periphery of the vehicle, and estimating a boundary of a roadway based on reflected waves which are detected by a sensor for detecting reflected waves;
   detecting a mobile body based on multiplexed reflected waves which are detected by the sensor;
   estimating a progress region of an object vehicle when the object vehicle is disposed on a vehicle side of the boundary, based on a position of the detected object vehicle, upon detecting the object vehicle which is moving in an adjacent lane behind the boundary of the roadway,
   wherein the object vehicle is outside of a detection area of the sensor and the magnetic or ultrasonic waves are reflected to the object vehicle by the boundary; and
   when the object vehicle is determined to be in the progress region, at least one of (a) turning on a light indicating to refrain from changing lanes and (b) via a speaker outputting a sound indicating to refrain from changing lanes.

6. A non-transitory computer readable medium including computer program for making a computer execute the processes of:
   outputting magnetic waves or ultrasonic waves to a periphery of a vehicle, and estimating a boundary of a roadway based on reflected waves which are detected by a sensor for detecting reflected waves;
   detecting a mobile body based on multiplexed reflected waves which are detected by the sensor; and
   estimating a progress region of an object vehicle when the object vehicle is disposed on a vehicle side of the boundary based on a position of the detected object vehicle upon detecting the object vehicle which is moving in an adjacent lane behind the boundary of the roadway,
   wherein the object vehicle is outside of a detection area of the sensor and the magnetic or ultrasonic waves are reflected to the object vehicle by the boundary, and
   when the object vehicle is determined to be in the progress region, at least one of (a) turning on a light indicating to refrain from changing lanes and (b) via a speaker outputting a sound indicating to refrain from changing lanes.

7. A system for supporting the driving of a vehicle, the system comprising:
   one or more processors;
   memory including instructions that, when executed by the one or more processors, cause the one or more processors to:
      estimate a first distance to a boundary of a roadway beside the vehicle based on magnetic or ultrasonic waves reflected back by the boundary and detected by a sensor of the vehicle;
      based on the first distance and based on waves reflected by the boundary to a second vehicle in a lane between the vehicle and the boundary while the second vehicle is outside of a detection area of the sensor, determining a second distance to the second vehicle and a position of the second vehicle;
      estimate a progress region of the detection area based on the position of the second vehicle;
      determine whether the second vehicle is in the progress region; and
      when the second vehicle is determined to be in the progress region, at least one of (a) turn on a light indicating to refrain from changing lanes and (b) via a speaker outputting a sound indicating to refrain from changing lanes.

* * * * *